United States Patent [19]
Weng

[11] Patent Number: 5,566,674
[45] Date of Patent: Oct. 22, 1996

[54] METHOD AND APPARATUS FOR REDUCING ULTRASOUND IMAGE SHADOWING AND SPECKLE

[75] Inventor: Lee Weng, Issaquah, Wash.

[73] Assignee: Siemens Medical Systems, Inc., Iselin, N.J.

[21] Appl. No.: 496,991

[22] Filed: Jun. 30, 1995

[51] Int. Cl.$^6$ ...................................................... A61B 8/00
[52] U.S. Cl. ...................................................... 128/660.07
[58] Field of Search ........................ 128/660.06, 660.07, 128/660.08, 660.09, 660.10, 661.01; 364/413.13, 413.25; 73/625, 626; 348/473, 474

[56] References Cited

U.S. PATENT DOCUMENTS

| | | |
|---|---|---|
| 4,431,007 | 2/1984 | Amazeen et al. . |
| 5,257,626 | 11/1993 | Pelc et al. ............................. 128/653.2 |
| 5,305,104 | 4/1994 | Jensen et al. ............................ 348/473 |
| 5,353,354 | 10/1994 | Keller et al. ....................... 364/413.25 |

OTHER PUBLICATIONS

An Electronic Video Camera Image Stabilizer Operated On Fuzzy Theory, by Yo Egusa et al., 1992 IEEE (0–7803–0236–Feb. 1992), pp. 851–858.

Primary Examiner—George Manuel

[57] ABSTRACT

A method and apparatus is provided for generating a spatially compounded ultrasonic image using an image registration method (IR-SC). In the image registration method, a current image frame is correlated with a previously generated IR-SC image in order to derive the transducer motion information for IR-SC image generation. Specifically, the current image frame is divided into several smaller sub-frame regions, and a very fast and robust image motion detection algorithm is utilized to measure the sub-frame motion. This algorithm uses a fast adaptive coarse/fine minimum-sum-absolute-difference (MSAD) search strategy to compute an initial estimation of the local motion vectors. The initial estimation is combined with two measurement parameters by use of a fuzzy logic technique to derive a final estimation of the local motion vectors. The final local motion vectors are applied to a least-squares (L-S) process in order to estimate global image motion. Based on the global image motion information, the current image frame is transformed geometrically to coincide with the previously compounded IR-SC image frame. Once transformed, the current image frame is compounded with the previously compounded image frame to provide a new IR-SC image. Finally, a fast display technique generates and displays the IR-SC image.

20 Claims, 3 Drawing Sheets

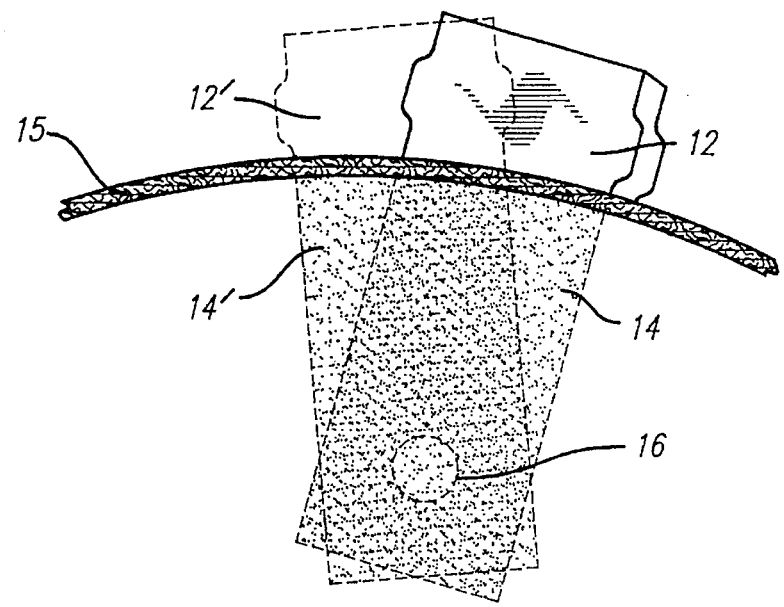
FIG. 1
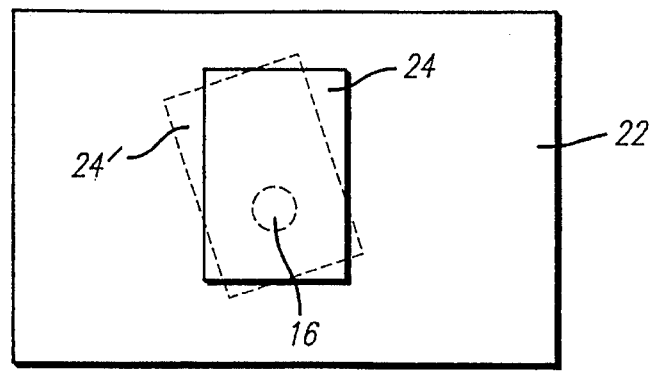
FIG. 2
FIG. 5
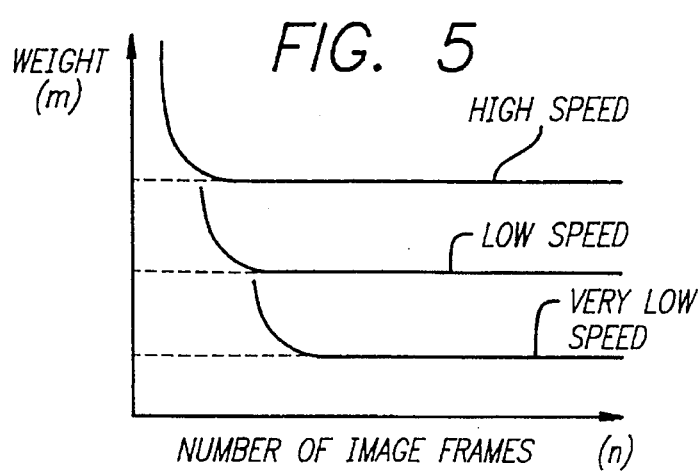
FIG. 3
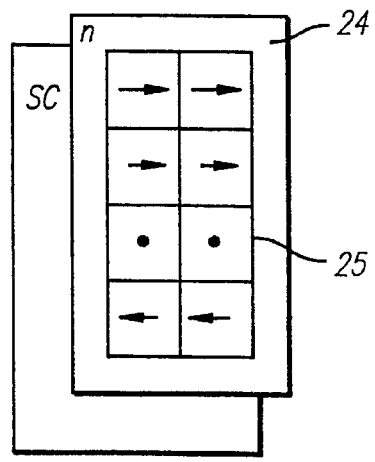

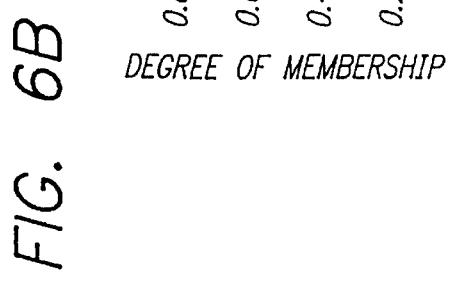
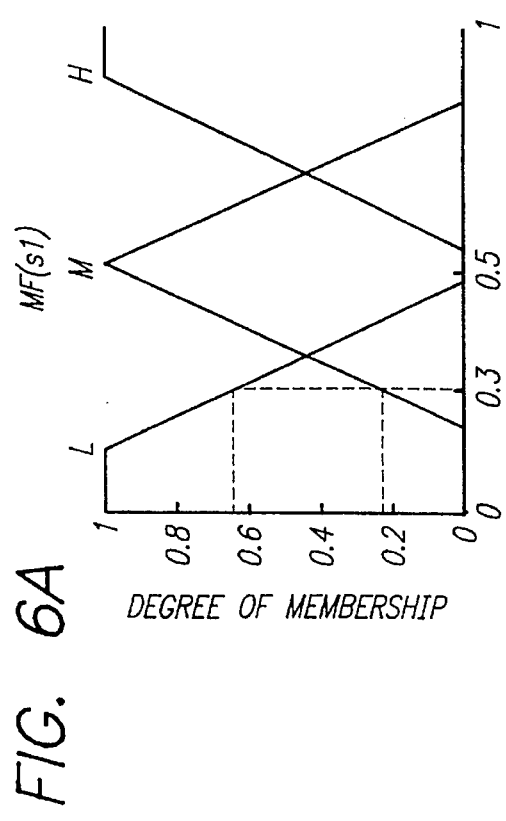
FIG. 6A
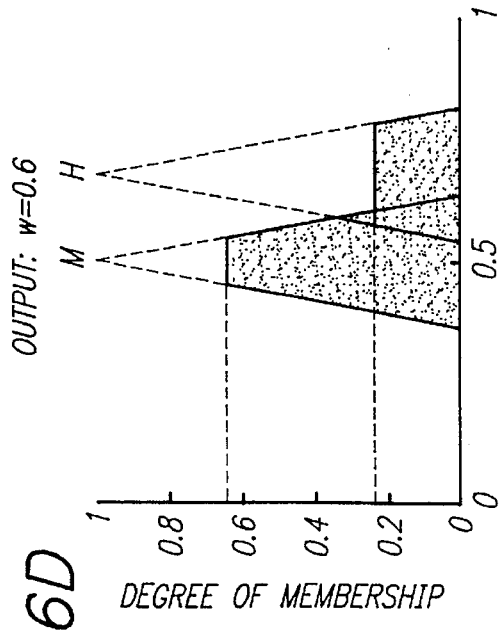
FIG. 6B
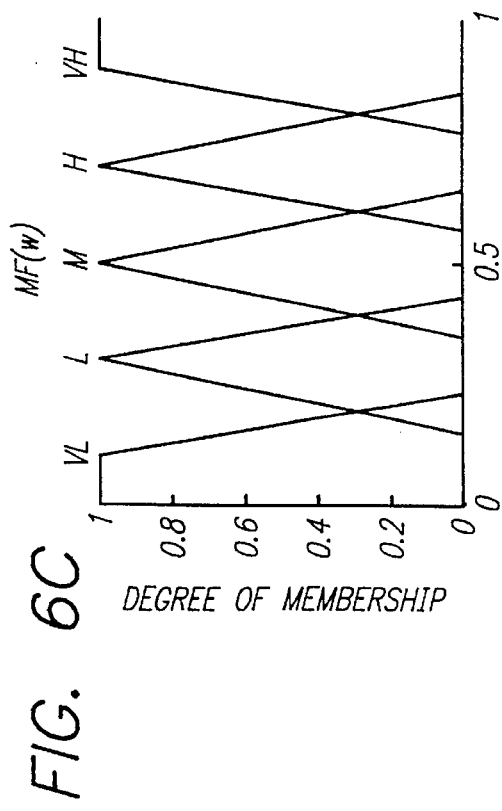
FIG. 6C
FIG. 6D

METHOD AND APPARATUS FOR REDUCING ULTRASOUND IMAGE SHADOWING AND SPECKLE

RELATED APPLICATION

This patent application relates to copending application Ser. No. 08/414,978, filed Mar. 31, 1995, for METHOD AND APPARATUS FOR GENERATING LARGE COMPOUND ULTRASOUND IMAGE.

BACKGROUND OF THE INVENTION

1. Field of the Invention

This invention relates to ultrasonic diagnostic imaging, and more particularly, to an ultrasonic imaging system that produces a spatially compounded image by an image registration method that correlates movement between consecutive image frames.

2. Description of Related Art

Ultrasonic imaging techniques are commonly used to produce two-dimensional diagnostic images of internal features of an object, such as a human anatomy. A diagnostic ultrasonic imaging system for medical use forms images of internal tissues of a human body by electrically exciting an acoustic transducer element or an array of acoustic transducer elements to generate short ultrasonic pulses that travel into the body. The ultrasonic pulses produce echoes as they reflect off of body tissues that appear as discontinuities or impedance changes to the propagating ultrasonic pulses. These echoes return to the transducer, and are converted back into electrical signals that are amplified and decoded to produce a cross-sectional image of the tissues. These ultrasonic imaging systems are of significant importance to the medical field by providing physicians with real-time, high resolution images of the internal features of a human anatomy without resort to more invasive exploratory techniques, such as surgery.

The acoustic transducer which radiates the ultrasonic pulses typically comprises a piezoelectric element or matrix of piezoelectric elements. As known in the art, a piezoelectric element deforms upon application of an electrical signal to produce the ultrasonic pulses. In a similar manner, the received echoes cause the piezoelectric element to deform and generate the corresponding electrical signal. The acoustic transducer may be packaged within a handheld device that allows the physician substantial freedom to manipulate the transducer easily over a desired area of interest. The transducer would then be electrically connected via a cable to a central control device that generates and processes the electrical signals. In turn, the control device transmits the image information to a real-time viewing device, such as a video display terminal (VDT). The image information may also be stored to enable other physicians to view the diagnostic images at a later date.

A drawback of conventional ultrasonic imaging systems is that the image frames are susceptible to various undesirable phenomena, such as ultrasound image "shadowing" or "speckle." Ultrasound shadowing occurs when the ultrasonic pulses produce shadows by reflection from tissue regions of disparate density that effectively prevent the ultrasonic pulses from reaching a region of interest and producing an echo return. When this happens, information regarding the region of interest is not collected, and the imaging system cannot produce a complete image of the region. To the viewer of the image, the image shadowing appears as dark patches that cover portions of the region of interest. The dark patches tend to mask or otherwise obscure small image detail and contrast differences within the image, making diagnostic analysis of the image more difficult and thus less reliable.

The image shadowing phenomenon and its solution are analogous to a similar problem with the use of a flashlight to illuminate an object of interest. If the object of interest lies either partially or completely within the shadow of another object, the object of interest cannot be completely seen; however, the flashlight can be repositioned to illuminate the object of interest from another direction in order to avoid the shadow of the blocking object. This technique represents an image averaging technique. If all the information received by illuminating the object of interest from different viewing angles were combined into a single image, then a complete, multidirectional image of the object of interest could be obtained. Within the ultrasound domain, the acoustic transducer can be repositioned so that the region of interest is imaged from several different directions. By combining these different ultrasonic images together, the image shadowing would be filled in and a more complete image of the region of interest could be obtained. This process of combining multiple images into a single image is commonly referred to as spatial compounding.

Ultrasound image speckle is an artifact caused by coherent image formation. A speckle pattern is generated by interference among echoes from a large number of randomly distributed ultrasound scatterers within the imaged area. The ultrasound speckle appears as random noise in the image, and its existence makes ultrasound diagnosis more difficult, especially in areas having low contrast and small-sized lesions. It has been observed that by varying the position of the ultrasound imaging transducer slightly, the image of the lesions and other deterministic targets in the imaged region is relatively unchanged, but the speckle pattern will change substantially. A spatially compounded image obtained by averaging several images taken from slightly different spatial locations would have significantly reduced ultrasound speckle.

There are two known methods for generating a spatially compounded ultrasound image. A first technique utilizes a conventional transducer that is moved to various locations to acquire several different images. The transducer location is accurately measured by sensing devices in order to register each of the discrete image frames together into a single compound image. An example of a compound image-scanner utilizing angular sensing devices on an arm assembly is disclosed in U.S. Pat. No. 4,431,007, to Amazeen et al., for REFERENCED REAL-TIME ULTRASONIC IMAGE DISPLAY. In practice, however, the arm assembly is awkward and inflexible to operate, and the sensing devices add significant complexity and cost to the ultrasonic imaging system.

A second technique uses a large aperture phased array transducer to generate two or more images at slightly differing viewing angles from a fixed transducer location. The images can be readily combined since their relative orientation is generally known, or can be ascertained. This technique produces acceptable results when the region of interest is relatively shallow below the skin surface, as very little transducer movement is necessary. The technique is less effective for deeper level imaging, however, since the phased array transducer must necessarily be very large in order to produce viewing angles between individual image frames that are large enough to yield acceptable results.

Thus, a critical need exists for a method and apparatus for spatially compounding a plurality of discrete image frames produced by an ultrasonic imaging system into a single image in a manner that overcomes the drawbacks of the prior are techniques. Of particular importance, the method and apparatus should be compatible with modern handheld ultrasonic transducers without encumbering the handheld transducers with position sensing devices that undesirably increase the cost, weight and complexity of such imaging systems.

SUMMARY OF THE INVENTION

This application provides a method and apparatus for generating a spatially compounded ultrasonic image using an image registration method, referred to herein as an IR-SC image. In the image registration method and apparatus, a current image frame is correlated with previously generated IR-SC images in order to derive the transducer motion information for IR-SC image generation.

In particular, the current image frame is divided into several smaller sub-frame regions, and a very fast and robust image motion detection algorithm is utilized to measure the sub-frame motion. This algorithm uses a fast adaptive coarse/fine minimum-sum-absolute-difference (MSAD) search strategy to compute an initial estimation of the local motion vectors. The initial estimation is combined with two measurement parameters by use of a fuzzy logic technique to derive a final estimation of the local motion vectors. The final local motion vectors are applied to a least-squares (L-S) process in order to estimate global image motion. Based on the global image motion information, the current image frame is transformed geometrically to coincide with the previously compounded image frame. Once transformed, the current image frame is compounded with the previously compounded image frame to provide a new IR-SC image. Finally, a fast display technique generates and displays the IR-SC image.

BRIEF DESCRIPTION OF THE DRAWINGS

FIG. 1 is a side sectional view of a conventional ultrasound transducer manipulated spatially to obtain incoherent images of a region of interest;

FIG. 2 illustrates an image display of a current image frame;

FIG. 3 is a block diagram illustrating derivation of a local motion vector deviation factor for the minimum-sum-absolute-difference search;

FIG. 5 is a graph illustrating derivation of a weight value based on the number of image frames; and FIGS. 6A through 6D are graphs illustrating fuzzy logic membership functions for the quality factor and the deviation factor to derive a control value and a single numerical output.

DETAILED DESCRIPTION

Figure 4:
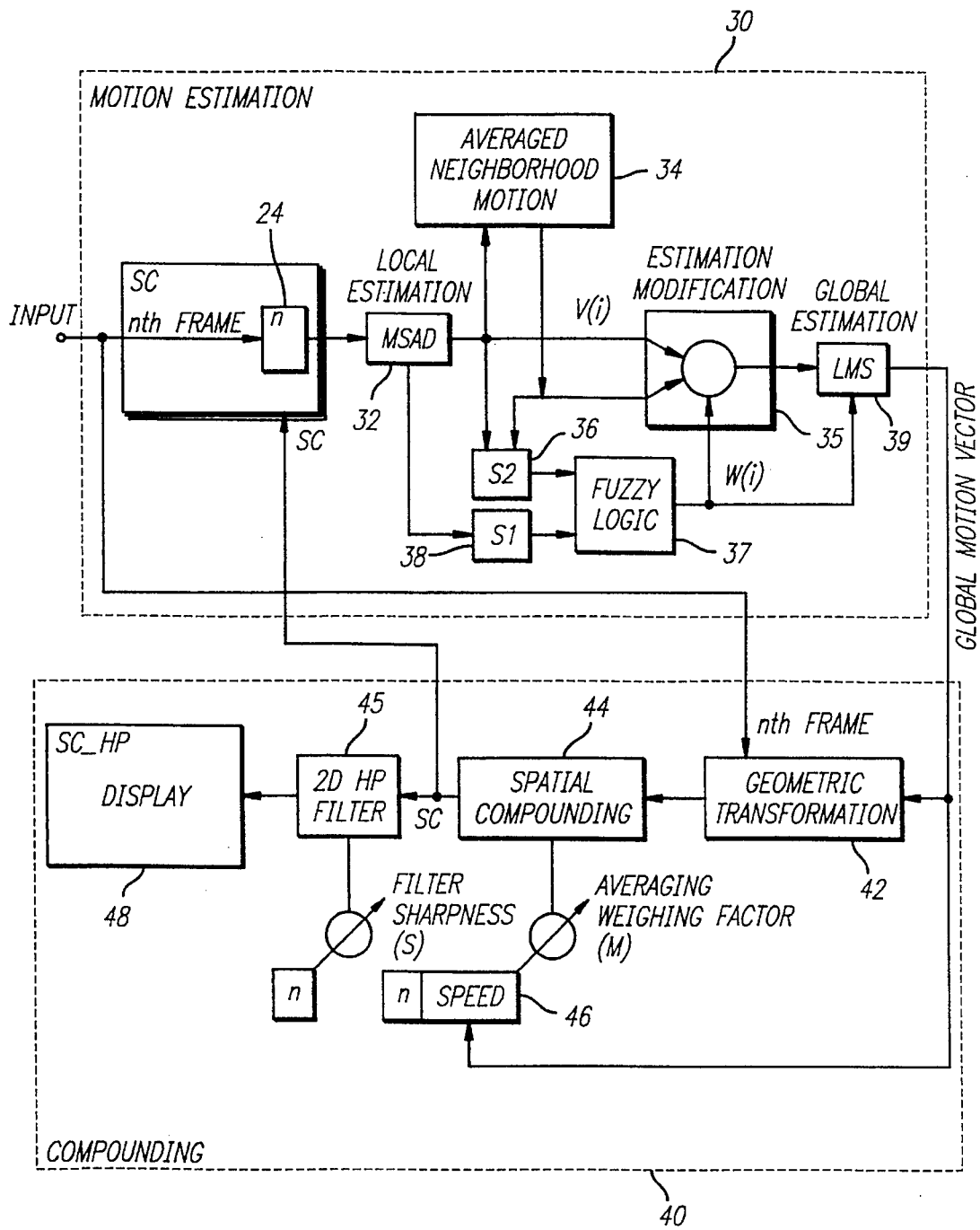
FIG. 4 is a block diagram illustrating an image registration based image compounding method in accordance with this invention.

This invention satisfies the critical need for a method and apparatus to spatially combine discrete image frames produced by an ultrasonic imaging system in a manner that reduces ultrasound image shadowing and speckle. In the method and apparatus of this invention, an image registration technique is used to correlate consecutive image frames. Significantly, the transducer motion information is derived without encumbering the transducer with position sensing devices that would otherwise increase the cost, weight and complexity of such ultrasonic imaging systems. In the detailed description that follows, like element numerals are used to describe like elements illustrated in one or more of the figures.

Referring first to FIGS. 1 and 2, portions of an ultrasonic imaging system adapted for real-time display within a clinical environment are illustrated. In FIG. 1, a transducer 12 is pressed against a skin surface 15 of a patient as part of an ultrasonic imaging operation. A region of interest 16 lies below the skin surface 15 that may be completely or partially obscured by other tissue disposed between the region of interest and the skin surface 15. To perform the imaging operation of the region of interest 16, the operator manipulates the transducer 12 to various positions along the patient's skin surface 15. The previous position of the transducer is denoted by 12' in FIG. 1. As known in the art, an acoustically conductive lubricating agent may be applied to the skin surface 15 prior to bringing the transducer 12 into contact with the skin so as to improve the acoustic coupling between the transducer and the patient.

The transducer 12 includes either a single piezoelectric element or matrix of individual piezoelectric elements that generate ultrasonic pulses in response to electrical signals. A plane of ultrasonic pulses 14, 14' associated with the current and previous positions of the transducer 12, 12', respectively, propagate through the skin 15 of the patient. Although the ultrasonic pulse planes 14, 14' are illustrated as a single contiguous planar beam of acoustic energy, it should be appreciated that each pulse plane actually comprises a plurality of sequential pulses from each of the piezoelectric elements that fire in the manner of a raster or sector scan. The ultrasonic pulse planes 14, 14' echo off of the patient's internal anatomical features, including the region of interest 16. The echoes return through the skin to the transducer 12 which converts the echoes back into electrical signals that are transmitted to an image processor for processing into a visual image. The image processor decodes the electrical signals into a two-dimensional, cross-sectional image 24 that is displayed on the video display terminal 22 of FIG. 2. The image information may also be electronically stored in a memory medium, including a non-volatile storage medium such as a disk or tape drive, a volatile storage medium such as a solid state memory, or can be printed to a hard copy image such as a photograph.

The current ultrasonic image 24 displayed on the video display terminal 22 (or stored by use of the various other storage media described above) comprises only the information representative of the region traversed by the ultrasonic pulse plane 14. Although a previous image corresponding to the ultrasonic pulse plane 14' is taken from a different orientation than that of the current image 24, the previous image and its respective orientation is not reflected on the video display terminal 22. Instead, the video display terminal 22 typically displays the current image 24 only, with the current image superimposed over and replacing the previous image. In other words, the image content changes but the displayed orientation remains constant. As noted above, it would be very desirable to provide a spatially compounded image in which each of the differing perspectives are combined to form a single image that reflects the particular orientations of the differing images, such as the previous image 24'.

Referring now to FIG. 4, a block diagram of an image registration based spatial compounding method (IR-SC) in accordance with this invention is illustrated. The previous image frame 24' of FIG. 2 (also referred to herein as image frame n−1) is combined with all previous image frames into a spatially compounded image frame (the IR-SC image frame), which provides a reference image. The current image frame 24 (also referred to herein as image frame n or the n'th image frame) is compared with the IR-SC image frame to estimate motion of the transducer, and is adjusted to further improve the IR-SC image. There are two major advantages of using the IR-SC image frame as a reference. First, the IR-SC image frame has less speckle than the uncompounded image frame n−1. Therefore, the estimation of image frame n motion with respect to the IR-SC image frame is less sensitive to speckle variation and more robust in matching deterministic image features. Second, the global accumulative registration error is eliminated so that the user can move the transducer back and forth without the likelihood of mismatching.

In order to estimate image motion from the IR-SC image frame to image frame n, frame n is divided into a plurality of sub-frame regions 25, and the local motion of each of the sub-frame regions is estimated. For I total blocks, the i'th block of frame n is defined as n(i). The particular size and number of the sub-frame regions 25 are selected by consideration of various factors. The sub-frame region size should approximate the size of the particular image features. For example, image features such as tissue boundaries and blood vessels would require a relatively small sub-frame region size. Nevertheless, such a small sub-frame region size would not be suitable for estimation of motion because the small sub-frame region size decorrelates very rapidly with relatively large magnitudes of motion. Moreover, the small sub-frame region size would not be stable for in-vivo images where small scale tissue motion exists. At the same time, if the sub-frame region size is too large, there will be too few sub-frame regions per image frame for motion estimation and the motion estimation will be unstable. Further, a large sub-frame region size may introduce an image rotation error into the local motion estimation where the sub-frame region is incorrectly assumed to have a translation component but no rotation component.

In a preferred embodiment of the invention, a sub-frame region size of approximately 48×48 pixels is deemed acceptable for motion estimation in view of these factors in relation to an image frame size of about 200×400 pixels. A minimum sub-frame region size of 32×32 pixels could also be utilized in relation to a smaller image size. These sub-frame region sizes result in a number I between approximately eight and twenty in order to yield the best results.

FIG. 3 illustrates the current image frame n divided into a plurality of sub-frame regions 25. The local motion of each subframe region n(i) of image n is estimated by moving the sub-frame region n(i) around on the IR-SC image frame to find the "best match." Specifically, the current frame n is matched with the portion of the IR-SC image frame which includes the region of interest. The "best match" is determined by use of a minimum-sum-absolute-difference technique (MSAD) 32 to match the n(i) sub-frame regions 25 with the associated region of the IR-SC image. The sum-absolute-difference (SAD) is the sum of absolute differences between corresponding pixel values between each subframe region 25 and the IR-SC image. The "best match" between the sub-frame region 25 and the IR-SC image region occurs where the SAD value is at a minimum. The MSAD technique is used to derive a first estimation of the local motion vector v(i) having a direction and magnitude indicating how the sub-frame region n(i) translated from the IR-SC image frame to the n image frame. The direction of the local motion vector v(i) for each one of the sub-frame regions 25 is denoted by the arrows of FIG. 3. It should be noted that the sub-frame regions 25 that do not contain any arrows have experienced negligible local motion.

It should be apparent that calculating the MSAD could be a very slow computing process if the number of blocks is large, the block size is large, and the search region is large. For example, a frame n having sixteen sub-frame regions 25 with a 48×48 pixel size and an IR-SC image region of 64×64 pixels would require about 300,000,000 separate additions/subtractions and about 65,000 comparisons to complete a single MSAD computation. Even with the relatively high speed of conventional processors, this would still encompass too much computation to accommodate real-time application. Accordingly, various search techniques are utilized in order to reduce the magnitude of the MSAD computation.

One such technique for calculating the MSAD utilizes a conventional MPEG encoder. MPEG, or Moving Picture Expert Group, is an industry accepted data compression standard for digitizing graphical information. MPEG encoders are commercially available that can be used to perform a rough estimate of MSAD location based on historical movement of the image. A "best match" is sought between an image characteristic within a sub-frame region 25 and an IR-SC image region by searching within a local neighborhood comprising a finite dimensional range, such as within ten pixels in the X and Y directions relative to the image characteristic. A drawback of the use of an MPEG encoder is that it results in a high incidence of inaccurate local motion vectors, which must be filtered out.

Alternatively, a fast adaptive coarse/fine MSAD search strategy can be devised that significantly reduces the total magnitude of computation. A coarse search can be performed first to reduce the IR-SC image region to a smaller area, followed by a fine search within the smaller area. The two-dimensional MSAD search can be reduced to two one-dimensional searches in the X and Y directions, respectively. The first search should be conducted in the X direction to quickly narrow down the search region, followed by subsequent alternating one-dimensional searches in both the X and Y directions to quickly find the MSAD location. Points which have been searched during the coarse search or have been searched in the other direction could be skipped during the fine search. Based on the above search strategy, in most cases the location of the MSAD can be identified after one coarse and one medium search in the X direction, one coarse search in the Y direction and one small two-dimensional fine search in both directions. For the same example given above, the total number of computations can be reduced to 2,600,000 additions/subtractions and 560 comparisons; representing a reduction of the total number of computations by roughly 115 times.

Under the influence of image noise, tissue motion and other image artifacts, the first MSAD motion estimation is not always very reliable. Accordingly, two measures of the quality and reliability of the first local motion vector estimation v(i) are devised, termed S1(i) and S2(i). S1(i) is a quality factor of MSAD, and measures the difference between the value of MSAD and mean SAD. MSAD quality increases with the value of S1(i), i.e., the deeper the SAD valley, the better is MSAD quality. When strong image noise exists, or when there is a lack of image features, the SAD map will become more flat so that S1(i) becomes smaller. In that case, the estimation of v(i) becomes less reliable.

The second parameter S2(i) measures how much v(i) deviates from the averaged intraframe neighborhood motion 34. The averaged neighborhood motion of the i'th block, h(i)

is the recursively averaged sum of previous final local motion vector outputs of the i'th block. S2(i) is the vector difference between v(i) and h(i). Generally, image motion is fairly smooth and consistent for both experienced and unexperienced ultrasound operators. If one value of v(i) has a very different direction and magnitude as compared with its history, it is very likely that this estimation is under the influence of noise or local tissue motion and does not accurately reflect true image local motion. In this case the v(i) estimation is not very reliable. Thus, a large value of S2(i) indicates that the estimated v(i) is less reliable.

While the above estimation quality control concept is easy to understand, it is difficult to implement in practice since image changes caused by motion of the transducer can be rather complex. Accordingly, the quality and reliability of the motion estimate can be efficiently quantized by use of fuzzy logic. A fuzzy logic control block 37 receives S1(i) and S2(i) as inputs, combines them using fuzzy rules (described below), and produces a single numerical output w(i) which represents a degree of accuracy of v(i). The numerical output w(i) ranges from zero to one, with the estimation accuracy of v(i) increasing as w(i) approaches one.

The inputs S1 (i) and S2 (i) are first "fuzzified" into the linguistic expressions, or labels, "high", "medium" and "low". Output w(i) also has its fuzzy expression as "very high", "high", "medium", "low" and "very low". Membership functions of S1(i), S2 (i) and w(i) are defined from a large number of experimental results, and are illustrated at FIGS. 6A through 6C, respectively. The membership function of S1(i) is graphically illustrated at FIG. 6A as comprising three regions labeled as L (low), M (medium) and H (high). The regions overlap to a certain extent; specifically, the L and M regions overlap, and the M and H regions overlap. The horizontal axis of the membership function graph defines the measured value of S1(i), and the vertical axis defines the degree of membership of the measured value within the defined label.

The membership function of S2(i) is graphically illustrated at FIG. 6B, and is constructed similar to the membership function of S1(i). Similarly, the membership function of w(i) is graphically illustrated at FIG. 6C, and is constructed similar to the membership functions of S1(i) and S2(i), though it includes five overlapping regions labeled as VL (very low), L (low), M (medium), H (high), and VH (very high).

Seven fuzzy rules are used to define the relationship between S1(i), S2(i) and w(i). These fuzzy rules include:

(1) If S1(i) is low (L) AND S2 (i) is also low (L), then w(i) is medium (M);

(2) If S1(i) is medium (M) AND S2(i) is low (L), then w(i) is high (H);

(3) If S1(i) is high (H) AND S2(i) is low (L), then w(i) is very high (VH);

(4) If S1(i) is low (L) AND S2(i) is medium (M), the w(i) is low (L);

(5) If S1 (i) is medium (M) AND S2(i) is also medium (M), then w(i) is medium (M);

(6) If S1(i) is high (H) AND S2(i) is medium (M), then w(i) is high (H); and (7) If S2(i) is high (H), then w(i) is very low (VL).

The fuzzy rules are applied in parallel to determine the truth of the rules. For example, assume that measured values of S1(i) and S2(i) are 0.3 and 0.1, respectively. In FIG. 6A, a measured value of 0.3 relates to degrees of membership of approximately 0.65 in the L label and approximately 0.25 in the M label. In FIG. 6B, a measured value of 0.1 relates to a degree of membership of approximately 0.75 in the L label only. As a result, only the first two fuzzy rules are true, though they yield inconsistent results in that the first fuzzy rule concludes w(i) is medium and the second fuzzy rule concludes that w(i) is high. The output w(i) must be converted back to a numerical value, and the inconsistent results must be reconciled.

Under the first fuzzy rule, the low value of S1(i) is combined using a logical AND with the low value of S2(i) to provide the medium value of w(i). Under the logical AND operation, the minimum value of the truth of the expressions is taken as the truth level of the rule. In other words, the 0.65 degree of membership of S1(i) is less than the 0.75 degree of membership of S2(i), and is thus taken as the truth level for the first fuzzy rule. Similarly, under the second fuzzy rule, the medium value of S1(i) is combined using a logical AND with the low value of S2(i) to provide the high value of w(i). The 0.25 degree of membership of S1(i) is less than the 0.75 degree of membership of S2(i), and is thus taken as the truth level for the second fuzzy rule. The M and H labels of the w(i) membership function are then truncated at the truth levels defined by the fuzzy rules, as illustrated graphically in FIG. 6D.

Finally, a centroid defuzzification technique is used to convert the fuzzy output back to a numerical number w(i). Using this technique, an estimate of the center of gravity is provided for the entire region determined to be true (illustrated as the shaded region of FIG. 6D). From FIG. 6D, the center of gravity of the shaded region is approximately 0.6, providing a numerical value for w(i).

After the reliability parameter w(i) is obtained, the next step of the block diagram of FIG. 4 is to use w(i) to improve the local motion estimation v(i) by the estimation modification 35. If w(i) is large, v(i) is used directly as the final local motion vector lmv(i). In contrast, if w(i) is very small, the averaged neighborhood motion h(i) is used as the estimated lmv(i), since the averaged neighborhood motion is more likely to be a better estimation than the less reliable v(i). If w(i) is neither very large nor very small, it is used as a weighting factor to average v(i) and h(i). For instance, if w(i)=0.6, as in the above example, then the local motion vector lmv(i) is given by the following equation:

$$lmv(i) = 0.6 v(i) + (1-0.6) h(i)$$

The averaged neighborhood motion h(i) is also updated recursively by averaging lmv(i). The averaged neighborhood motion is given by the following equation:

$$h(i) = \frac{1}{i} \sum_{j=1}^{i-1} lmv(j)$$

where j is an index value ranging from 1 to i–1, representing the frames prior to the n'th frame.

Once all of the local motion vector outputs lmv(i) are estimated for the n'th frame, the outputs are combined together at 39 to estimate the frame global motion vector, gmv(n). Minimum least-squares (L-S) error parameter fitting is used to combine the motion vector outputs, using three optimization parameters including frame translation (Xn, Yn) and rotation 8n. The weighted L-S gives the local motion vector v(i) which has a larger w(i) more weight than those having smaller w(i). This way, the more reliable local motion vectors v(i) contribute more heavily to the optimization process.

The estimated global motion vector gmv(n) is then used to geometrically transform at 42 the current image frame n to match the orientation of the IR-SC image. If probe rotation is also large, it may be necessary to first rotate the IR-SC image back to a zero degree angle before it can be matched with the current image frame n. This results from the inherent difficulty of accounting for large angular differences between the IR-SC image and the current image frame n within the geometric transformation algorithm, and in some cases may double the geometric transformation computation in certain circumstances.

After geometric transformation, a recursive averaging algorithm 44 is used to spatially compound the current image frame n with the existing IR-SC image. In overlapping area, the new IR-SC image represents the weighted average of the SC image and the current image frame n, in accordance with the following equation:

$$SC(n) = ((1-m)\ (SC(n-1)) + (m\ \text{Input}(n))$$

where m is a weighting factor, n is the frame number, and Input(n) is the image data representing frame n. The weighting factor m ranges from 0 to 1, and is a function of both the frame number n and the frame motion speed estimated from the image registration algorithm described above, as indicated at 46 of FIG. 4.

FIG. 5 illustrates graphically the determination of the weighting factor m. When the spatial compounding process starts, the weighting factor m is mainly controlled by the image frame number n. For small values of the image number n, the weighting factor m is large, because the current frame should dominate when there has not been too many previous image frames to combine into the IR-SC frame. Conversely, after a large number of image frames, each individual frame should not have too much of an effect on the IR-SC frame. This way, there is a strong compounding effect in the beginning of the scan and the IR-SC image quickly converges to its maximum compounding effect. After a few frames, the weighting factor m becomes smaller and eventually a constant value is used for the weighting factor, which is defined by motion speed. As illustrated in FIG. 5, different values for the constant weighting factor m can be utilized for high speed, low speed and very low speed. The compounding effect is more reliable where there is high or moderate frame motion speed; if the transducer were kept still for several image frames (i.e., zero frame motion speed) the weight from these particular frames should be substantially less so as to not erase the previous IR-SC frame.

It is advantageous to use a constant minimum value for the weighting factor m as the frame motion approaches zero; otherwise, when the frame motion is very slow, the weighting factor m would become smaller and approach zero when the motion is stopped. This adaptive averaging technique not only makes the compounding effect independent from motion speed, but also eliminates the problem of erasing the IR-SC image when the probe motion is virtually stopped. The optimal constant value of the weighting factor m can be readily derived from a consideration of various factors, including the intended frame rate, the imaging depth and the transducer rotation.

After spatial compounding is complete, the image shadowing and speckle is greatly reduced; however, it is desirable to sharpen the IR-SC image to prevent it from having a flat or overly processed appearance. Accordingly, the IR-SC image is passed through a two-dimensional high-pass filter 45 to make image details and edges sharper prior to display. The two-dimensional sharpening filter may have the following structure:

$$\text{SHARP} = \begin{bmatrix} -0.33 & -0.33 & -0.33 \\ -0.33 & 3.67 & -0.33 \\ -0.33 & -0.33 & -0.33 \end{bmatrix} + (0.33\ s)$$

where the parameter s ranges from 0 to 1 and is a function of the frame number n. Before applying the two-dimensional filter to the IR-SC image, the filter characteristics should be normalized so that the sum of all its elements equals one. The parameter s controls the filter sharpening performance such that the smaller the parameter s, the sharper the output image. When the spatial compounding scan starts, the frame number n is small and the IR-SC image has more noise. Accordingly, the parameter s should be large to prevent the IR-SC image from over sharpening. Alternatively, the parameter s can be derived from a consideration of various factors, including transducer frequency and scan depth which effect the relative speckle size in the raster image. Higher probe frequency and larger scanning depth make the speckle size smaller (i.e., less pixels per resolution cell). In other words, the filter should also be adaptive to the change of relative resolution cell size.

Finally, the IR-SC image is displayed on a video display terminal 48 or other such device, providing a clear image of the region of interest. Clinical testing of the spatial compounding algorithm has demonstrated that the algorithm yields favorable results in terms of reduction of image speckle. The operator generates the spatially compounded image by moving the transducer back and forth linearly over the region of interest. As the number of frames increases, the quality of the IR-SC image continues to improve until the image speckle decorrelates and fine detail of the region of interest becomes visible.

It should be apparent that the above method and apparatus for generating a spatially compounded image is applicable to both real-time imaging and re-generation of recorded image information. In application, a physician may use a conventional ultrasonic imaging system to produce image frames that are recorded onto a permanent storage medium, such as tape. Subsequently, the image frames could be processed into an spatially compounded image for later viewing by the physician by bringing the recorded image frame data to a viewing station. The viewing station would then process the image frame data by use of the method described above to generate an IR-IR-SC image. It should also be apparent that the method and apparatus of this application are not limited to processing of ultrasonic images, but would be equally applicable to other imaging modalities, such as radar or photographic imaging.

What is claimed is:

1. A method for providing a spatially compounded image from a plurality of individual image frames, comprising the steps of:

dividing a current image frame into a plurality of sub-image regions;

estimating local motion vectors of the respective sub-image regions between the current image frame and a previously compounded image frame;

estimating global image motion vectors based on the estimated local motion vectors;

transforming the current image frame geometrically to coincide with the previously compounded image frame using the estimated global image motion vectors;

compounding the current image frame with the previously compounded image frame to provide a new compounded image; and displaying the new compounded image.

2. The method of claim 1, further comprising the step of filtering the new compounded image with a two dimensional high pass filter prior to said displaying step.

3. The method of claim 1, wherein the compounding step further comprises recursively weighing the amount of compounding based on the number of image frames.

4. The method of claim 1, wherein the step of estimating local motion vectors further comprises the steps of:

calculating an initial estimation of the local motion vectors using a fast adaptive coarse/fine minimum-sum-absolute-difference (MSAD) search; and deriving a final estimation of the local motion vectors from the initial estimation of the local motion vectors by use of a fuzzy logic technique.

5. The method of claim 4, wherein the step of deriving a final estimation further comprises the step of defining a first quality factor of the MSAD by measuring the difference between the value of MSAD and mean sum-absolute-difference (SAD).

6. The method of claim 5, wherein the step of deriving a final estimation further comprises the step of defining a second quality factor of MSAD by measuring deviation of the initial estimation of the local motion vector from an averaged neighborhood motion vector.

7. The method of claim 6, wherein the step of deriving a final estimation further comprises the step of defining membership functions for the first and second quality factors.

8. The method of claim 7, wherein the step of deriving a final estimation further comprises the step of determining a membership value for the first and second quality factors.

9. The method of claim 8, wherein the step of deriving a final estimation further comprises the step of combining the membership values for the first and second quality factors in accordance with predefined fuzzy rules to generate an output value.

10. The method of claim 4, wherein the step of calculating an initial estimation of the local motion vectors further comprises the steps of defining a search region having an area greater than an associated one of the sub-image regions, the one-dimensional searches being conducted within the search region.

11. The method of claim 1, wherein the step of estimating global image motion further comprises the step of applying the estimated local motion vectors to a least-squares (L-S) process.

12. The method of claim 1, wherein the step of dividing the individual image frames into a plurality of sub-image regions further comprises the step of dividing the individual image frames into a range of approximately eight to twenty sub-image regions.

13. A apparatus for providing a spatially compounded ultrasound image, comprising:

an ultrasonic scanner providing a plurality of individual ultrasonic image frames;

means for dividing a current image frame into a plurality of sub-image regions;

means for estimating local motion vectors of the respective sub-image regions the current image frame and a previously compounded image frame by use of a minimum-sum-absolute-difference search;

means for estimating global image motion vectors based on the estimated local motion vectors;

means for geometrically transforming the current image frame to coincide with the previously compounded image frame using the estimated global image motion vectors;

means for compounding the current image frame with the previously compounded image frame to provide a new compounded image; and means for displaying the new compounded image.

14. The apparatus of claim 13, further comprising means for filtering the new compounded image with a two dimensional high pass filter.

15. The apparatus of claim 13, wherein the compounding means further comprises means for recursively weighting the amount of compounding based on the number of image frames.

16. The apparatus of claim 13, wherein the means for estimating local motion vectors further comprises:

means for calculating an initial estimation of the local motion vectors using a fast adaptive coarse/fine minimum-sum-absolute-difference (MSAD) search; and means for deriving a final estimation of the local motion vectors from the initial estimation of the local motion vectors by use of a fuzzy logic technique.

17. The apparatus of claim 16, wherein the deriving means further comprises means for defining a first quality factor of the MSAD by measuring the difference between the value of MSAD and mean sum-absolute-difference (SAD).

18. The apparatus of claim 17, wherein the deriving means further comprises means for defining a second quality factor of MSAD by measuring deviation of the initial estimation of the local motion vector from an historical neighborhood measurement of the local motion vector.

19. The apparatus of claim 18, wherein the deriving means further comprises means for defining membership functions for the first and second quality factors.

20. The apparatus of claim 19, wherein the deriving means further comprises means for determining a membership value for the first and second quality factors.

* * * * *